United States Patent [19]
Baxter et al.

[11] Patent Number: 5,162,120
[45] Date of Patent: Nov. 10, 1992

[54] METHOD AND APPARATUS FOR PROVIDING JACKETS ON CABLE

[75] Inventors: G. Douglas Baxter; James C. Grant; John N. Garner, all of Kingston, Canada

[73] Assignee: Northern Telecom Limited, Montreal, Canada

[21] Appl. No.: 800,313

[22] Filed: Nov. 29, 1991

[51] Int. Cl.⁵ .............................................. B29C 47/28
[52] U.S. Cl. .............................. 425/113; 156/244.12; 156/500; 264/169; 264/174
[58] Field of Search ............... 264/174, 169; 425/113, 425/114, 461, 467; 156/244.12, 500

[56] References Cited

U.S. PATENT DOCUMENTS

| | | | |
|---|---|---|---|
| 2,366,528 | 1/1945 | Heath | 425/114 |
| 2,546,975 | 5/1951 | Churnell et al. | 425/113 |
| 2,628,998 | 2/1953 | Frisbie | 425/114 |
| 2,863,169 | 12/1958 | Foster | 425/113 |
| 2,960,482 | 11/1960 | Henning | 264/169 |
| 3,922,128 | 11/1975 | Solomon | 425/467 |
| 4,032,381 | 6/1977 | Eager, Jr. et al. | 156/244.12 |
| 4,050,867 | 9/1977 | Ferrentino et al. | 425/114 |
| 4,274,821 | 6/1981 | Kiemer | 425/114 |
| 4,568,507 | 2/1986 | Baxter | 156/244.12 |

FOREIGN PATENT DOCUMENTS 552254  1/1958  Canada .................. 425/113

Primary Examiner—Jeffery Thurlow
Attorney, Agent, or Firm—R. J. Austin

[57] ABSTRACT

Jacket extrusion apparatus in which a core tube located within an extruder head is provided with axial projections which are spaced around the tube. The projections break down accumulated drool from the extrudate and cause it to move away as small particles.

6 Claims, 2 Drawing Sheets

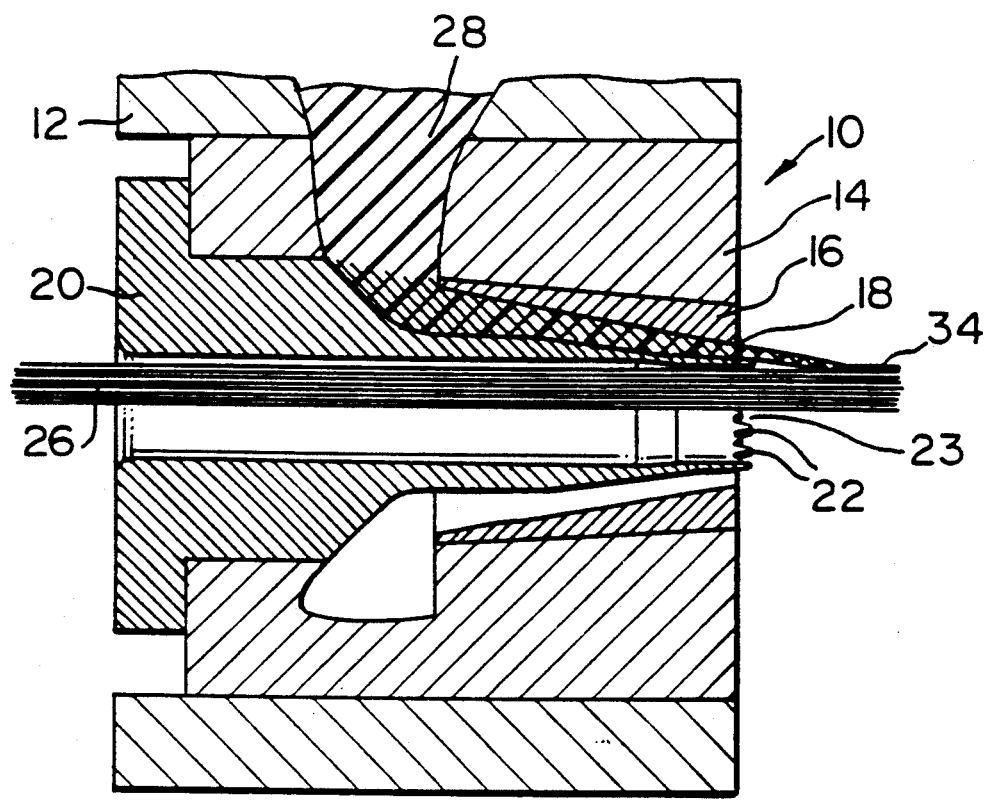
FIG. 1
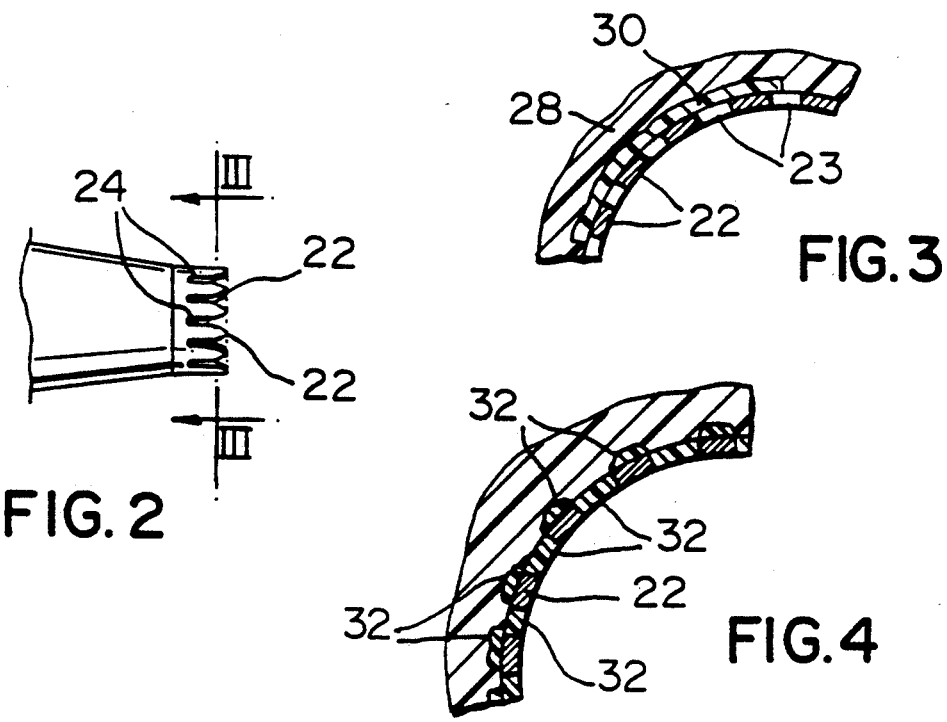
FIG. 2
FIG. 3
FIG. 4

METHOD AND APPARATUS FOR PROVIDING JACKETS ON CABLE

BACKGROUND OF THE INVENTION

1. Field of the Invention

This invention relates to methods and apparatus for providing jackets on cable.

2. Description of Related Art

In the manufacture of electrical cable, cable cores are surrounded by elastomeric jacketing material by extrusion techniques. There is a choice of jacketing materials dependent upon the design and use of the finished cable. For instance, for cables to be used inside buildings, jackets of polyvinylchloride compounds are normally required as these materials are considered to be more fire and flame resistant than other materials. For other uses, jackets formed from polyolefin compounds are used.

Problems are associated with the extrusion of jacketing materials. In particular, in the extrusion of polyolefin jacketing materials, e.g., compounds of polyethylene, in a known phenomenon, there is sometimes an interaction between surfaces of the extrusion apparatus and certain surface regions of the flowing extrudate which slows down the extrusion speed at these surface regions. The main extrudate continues to flow around these surface regions which may become stationary upon the surfaces of the extrusion apparatus, and further extrudate from the main flow stream may accumulate upon these stationary surface regions. This accumulation tends to continue until eventually it is caused, by the flow of the main stream, to break away from the surfaces of the extrusion apparatus and pass through the extrusion orifice, thereby deleteriously affecting the finished product. For instance, where a core tube is being used to guide a cable core through the extrusion apparatus, an accumulation of extrudate may form a partial or complete annular ring around the downstream end region of the core tube before that accumulation breaks away. As a result, this accumulation, which does not mix with the main extrudate flow, forms a circumferentially extending lump between the jacket and the cable core, thus creating an overlying ridge in the jacket. Such a ridge is unsightly and may be unacceptable to a customer, one reason possibly being because it locally increases the cable diameter and adds to problems in drawing the cable through holes which are just sufficiently large to accommodate the normal diameter of the cable.

SUMMARY OF THE INVENTION

The present invention seeks to provide a jacket extrusion apparatus which will alleviate the extrusion problems. The invention also seeks to provide a method of extruding the jacket onto a cable and which will also alleviate these problems.

Accordingly, the present invention provides a jacket extrusion apparatus for cable, comprising an extrusion head provided with a die orifice and a core tube disposed within the head and defining a passage for movement of the cable core along a passline through the core tube and through the die orifice, the core tube provided, at a downstream end region along the passline, with a plurality of axially extending projections which are circumferentially spaced around the passline for converting accumulations of extrudate present upon the core tube into discrete particles between the projections.

With the use of the apparatus according to the invention as defined above, any circumferentially extending accumulation of extrudate is forced against the downstream end region of the core tube by the pressure of the extrudate flow so that the projections pass through the accumulation thereby severing it into discrete particles which pass between the projections. These particles, the sizes of which are dictated by the distances between projections, are then forced by the extrudate from the extrusion orifice and may be sufficiently small as to be indiscernible beneath the jacket of the finished cable.

In constructions according to the invention, the axially extending projections may comprise a plurality of circumferentially spaced ribs extending upstream along the outer surface of the core tube with grooves between the ribs opening at the downstream end of the core tube. Alternatively, the projections extend downstream from fixed ends to free ends with the projections defining spaces between them which open onto the pass line for the cable core.

The downstream end of the core tube and the projections may extend downstream beyond the die orifice. This is particularly useful for creating axially extending indentations in the surface of the jacket as it is being formed. Hence if the grooves are formed after release of leaving the die orifice, then the jacket will be applied to the cable core by a conventional jacket sleeving process in which it is pulled axially thereby reducing its diameter and the grooves will remain upon the inner surface of the jacket so that the jacket will contact the cable core only in interfacial regions between the grooves. This will assist in stripping of the jacket from the cable core as and when necessary.

The invention also includes a method of extruding the jacket onto a cable core comprising passing the core along a passline through a core tube in extrusion apparatus and through a die orifice while simultaneously passing extrudate through the apparatus and around the core tube and extruding the extrudate through the orifice to provide a jacket around the core, the extrudate also flowing between a plurality of axially extending projections which are provided upon the core tube and are circumferentially spaced around the passline at a downstream end region of the core tube so as to force any circumferentially extending accumulation of extrudate on the core tube between the projections and convert the accumulation into discrete particles of extrudate which are then carried through the extrusion orifice by the extrudate.

In a preferred manner of performing the method, the projections provide axially extending grooves on the inner surface of the jacket, the jacket retaining the grooves upon engagement with the core and with the jacket contacting the core between the grooves.

BRIEF DESCRIPTION OF THE DRAWINGS

One embodiment of the invention will now be described by way of example, with reference to the accompanying drawings, in which:

FIG. 1 is a cross-sectional view along a pass line for cable core through part of an extrusion apparatus and showing an extrusion head;

FIG. 2 is a side-elevational view of a downstream end of a core tube forming part of the apparatus of FIG. 1;

FIG. 3 is a cross-sectional view taken along line III—III in FIG. 2 at one stage of the apparatus in use;

FIG. 4 is a view similar to FIG. 3 and showing the apparatus at a subsequent stage in use;

DESCRIPTION OF THE PREFERRED EMBODIMENT

Figure 5:
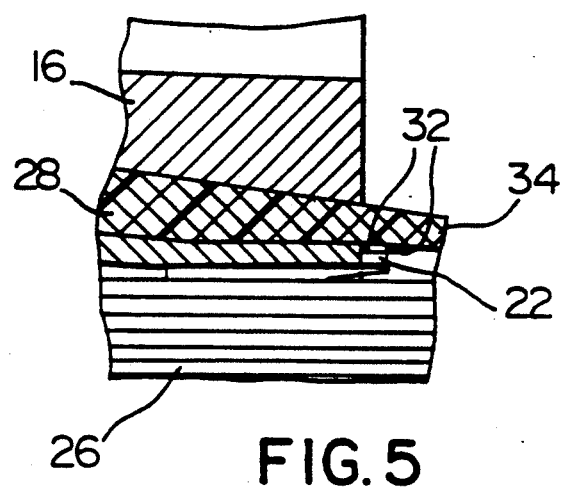
FIG. 5 is a view similar to FIG. 1 and to a larger scale, of the region of the extrusion apparatus around a die orifice.

As shown in FIG. 1, an extrusion apparatus for providing a jacket of polyethylene compound material upon a cable core comprises a crosshead 10 which is secured to the outlet end of an extruder (not shown). The crosshead comprises a housing 12 carrying a die holder 14 within which is located a die 16. The die has a die orifice 18 which is defined between the die and the downstream end region of a core tube 20 which extends upstream from the die orifice and surrounds a pass line for cable core to be guided through the die orifice.

At the downstream end region of the core tube, there are provided a plurality of axially extending projections which are circumferentially spaced around the core tube. As shown particularly by FIG. 2, these projections extend downstream in the form of axially extending spaced teeth 22 which are tapered towards free ends. Spaces 23 between the teeth open onto the passline for the cable core. Shallow grooves 24 extend upstream from junction regions between the teeth for a short distance along the downstream end region of the core tube. In this embodiment, these grooves may have a depth between 0.45 mm and 0.55 mm and also a width of between 0.50 mm and 0.60 mm. However, there may be a dimensional change dependent on change in cable core size.

In use of the apparatus of the embodiment, to apply an extruded jacket to a cable core 26 passing through the core tube 20, the polyolefin extrudate 28 is forced in normal fashion through the extruder head passageways and between the die 16 and the core tube 20, to be extruded through the die orifice 18 and onto the cable core. As extrusion proceeds, the polyethylene compound may occasionally tend to adhere in certain surface regions of the extrudate to surface regions of the core tube. Such accumulations of extrudate will allow the normal flowing pressurized extrude material to pass around them and through the extrusion orifice while being forced gradually along the core tube towards the orifice. As accumulations of this type approach the downstream end of the core tube, then, as shown in FIG. 3, they tend to form into circumferentially extending bands 30 of accumulated extrudate which may be completely annular in form and which, if allowed to proceed through the extrusion orifice, would form a ridge on the outer surface of the jacket material. However, with the present invention, and as shown by FIGS. 3 and 4, upon such a circumferentially extending band 30 reaching firstly the grooves 24 and then the teeth 22, the inward pressure of the jacket being formed around the accumulation will force it downwardly into the groove 24 and then between the teeth 22 so that the band is severed into discrete particles 32 as shown in FIG. 4. The sizes of these particles will be at least partly dependent upon the distances between the teeth 22 and also upon the design and dimensions of the teeth themselves. As extrusion pressure continues, these discrete particles 32 are then passed either through the spaces 23 between the teeth or from the ends of the teeth as shown by FIG. 5 so that they will eventually rest upon the cable core and lie beneath the jacket 34. The design of the teeth and the grooves 24 may be such that the discrete particles are sufficiently small that they will lie between the jacket and the core tube separately from one another and in such a way that there is no noticeable bulge in the jacket outwardly from any of the particles. Hence the presence of any such discrete particles of extrudate around the core tube will not deleteriously affect the appearance of the finished cable.

Figure 6:
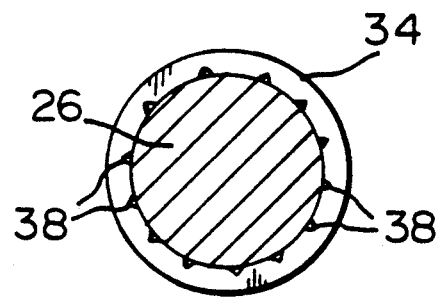
FIG. 6 is a cross-sectional view taken along line VI—VI in FIG. 1 of finished cable.

As shown by FIGS. 1 and 5, the teeth 22 extend downstream beyond the die orifice 18. Upon emergence from the die orifice, therefore, the jacket is spaced from the core and by take-up tension is then pulled radially onto the core. The jacket is thus forced inwards against the teeth 22 which assists in forcing any accumulation of extrudate between the teeth as described above. In addition, the jacket, in being pulled inwardly, is formed with axially extending grooves 38 along its inner surface, these grooves remaining in the jacket after it has come into contact with the cable core. As a result, as shown in FIG. 6, the jacket contacts the core in regions solely between the grooves. This construction facilitates removal of the jacket during stripping operations, particularly when a tightly drawn down jacket is applied to the cable core.

Hence the construction of the embodiment provides two functions in that it eliminates large accumulations of extrudate material which could deleteriously affect the appearance of cable, and also provides the grooves on the inside of the jacket to persist in jacket removal.

Figure 7:
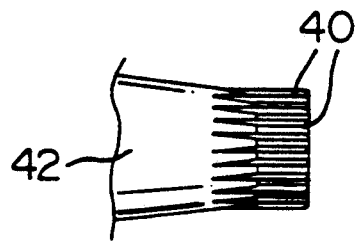
FIG. 7 is a view similar to FIG. 2 of a core tube forming a modification of the embodiment.

In a modification of the embodiment as shown by FIG. 7, the teeth 22 and grooves 24 are replaced on a core tube 42 by spline type projections 40 which are circumferentially spaced apart and extend axially along the outer surface of the downstream end region of the core tube. These spline type projections have sharp axially extending apices and define tapering grooves between them, the grooves opening at the downstream end of the core tube, and operate in a manner similar to that described above for the grooves 24 and teeth 22 to separate large accumulations of extrudate into discrete particles. In the modification, the discrete particles pass entirely into the grooves between the projections to be subsequently forced through the die orifice by the force of the extrudate. The core tube 42 provided with the projections 40 may be positioned within its accompanying die so that the downstream end of the core tube projects slightly beyond the die orifice. With such an arrangement, grooves similar to the grooves 38 may be formed upon the inside of the jacket during its formation to provide the advantages for stripping purposes described above.

What is claimed is:

1. A jacket extrusion apparatus for cable comprising an extrusion head having a die orifice and a core tube disposed within the head, the core tube extending at least to the vicinity of the die orifice and providing a guide passage for cable core along a passline through the core tube and through the die orifice, and the core tube and extrusion head defining between them an annular flow passageway around the core tube for jacket extrusion, the core having at a downstream end region, a plurality of axially extending projections radially spaced within the outer confines of the die orifice, formed upon the outer surface of the core tube, and circumferentially spaced around the core tube for converting accumulations of extrudate present upon the core tube into discrete particles between the projections.

2. Apparatus according to claim 1 wherein the projections extend downstream from fixed ends to free ends while defining spaces between them, the spaces opening onto the passline.

3. Apparatus according to claim 1 wherein the projections extend upstream along the outer surface of the core tube from the downstream end of the core tube, the projections defining grooves which open at the downstream end of the tube.

4. Apparatus according to claim 2 wherein the projections taper towards free ends of the projections.

5. Apparatus according to claim 4 wherein grooves extend upstream along the downstream end region of the core tube from circumferential positions between the projections.

6. Apparatus according to either of claims 2 and 3 wherein the projections extend downstream along the pass line and outwardly beyond the die orifice.

* * * * *